(12) United States Patent
Schwab (10) Patent No.: US 10,791,862 B2
(45) Date of Patent: Oct. 6, 2020

(54) SUPPORT DEVICE FOR AN ARTICLE

(71) Applicant: Dovrat Schwab, Hadar-Am (IL)

(72) Inventor: Dovrat Schwab, Hadar-Am (IL)

(\*) Notice: Subject to any disclaimer, the term of this patent is extended or adjusted under 35 U.S.C. 154(b) by 0 days.

(21) Appl. No.: 15/791,430

(22) Filed: Oct. 24, 2017

(65) Prior Publication Data
US 2018/0084935 A1 Mar. 29, 2018

Related U.S. Application Data

(63) Continuation of application No. PCT/IL2017/050172, filed on Feb. 12, 2017.

(60) Provisional application No. 62/295,532, filed on Feb. 16, 2016.

(51) Int. Cl.
*A47G 29/087* (2006.01)
*A47G 29/08* (2006.01)
*A47K 5/04* (2006.01)

(52) U.S. Cl.
CPC ......... *A47G 29/087* (2013.01); *A47G 29/083* (2013.01); *A47K 5/04* (2013.01)

(58) Field of Classification Search
CPC .... A47G 29/087; A47G 29/08; A47G 29/083; A47G 29/093; A47J 45/02; A47K 5/04; A47K 5/05
USPC ....... 248/301, 303, 304, 305, 322, 339, 340, 248/914, 309.1, 465.1, 112; D6/536, 537, D6/678.4; 211/106, 106.1, 119.003; 4/628, 654, 656
See application file for complete search history.

(56) References Cited

U.S. PATENT DOCUMENTS

| | | | | | |
|---|---|---|---|---|---|
| 1,361,056 | A | * | 12/1920 | Hickman | A45F 5/04 248/215 |
| 2,064,133 | A | * | 12/1936 | Von Schroeder | A47G 29/083 248/214 |
| 2,473,086 | A | * | 6/1949 | Montero | A47G 29/083 211/86.01 |
| 2,532,255 | A | * | 11/1950 | Davis | A47G 29/083 248/215 |
| 2,615,576 | A | * | 10/1952 | Dahlgren | B42F 9/00 211/50 |

(Continued)

FOREIGN PATENT DOCUMENTS

AT 504778 8/2008

OTHER PUBLICATIONS

Etsy, One Whale Tail Hook, Dec. 2015, https://www.etsy.com/listing/606220373/one-whale-tail-hook-beach-decor-nautical. (Year: 2015).*

(Continued)

*Primary Examiner* — Jonathan Liu
*Assistant Examiner* — Guang H Guan
(74) *Attorney, Agent, or Firm* — The Roy Gross Law Firm, LLC; Roy Gross (57) ABSTRACT

A support device configured to be placed on a horizontal surface and configured to hold an article. The support device includes a weight member, a rod extending laterally offset from the weight member and extending downwards from an edge of the horizontal surface and ending in an upward curve. A holder extends upwards from the upward curve and is configured to hold the article laterally from the horizontal surface. The weight member is configured to weigh more than an accumulated weight of the rod, holder and article.

6 Claims, 5 Drawing Sheets

(56) References Cited

U.S. PATENT DOCUMENTS

| | | | | |
|---|---|---|---|---|
| 3,058,258 A | * | 10/1962 | Barth | A47B 13/16 |
| | | | | 211/119.005 |
| 3,321,166 A | | 5/1967 | Gordon | |
| D256,745 S | * | 9/1980 | Figuered | A47K 3/281 |
| | | | | D6/537 |
| D278,875 S | * | 5/1985 | Beard | B42F 9/00 |
| | | | | D6/566 |
| 4,577,751 A | * | 3/1986 | St-Jacques | A47K 3/281 |
| | | | | 108/27 |
| 4,978,093 A | | 12/1990 | Kennedy | |
| 5,301,912 A | * | 4/1994 | Chang | F16B 21/165 |
| | | | | 248/221.11 |
| 5,620,105 A | | 4/1997 | Macek | |
| D384,505 S | | 10/1997 | Stewart | |
| 5,924,579 A | * | 7/1999 | DuPont | A45D 44/02 |
| | | | | 211/106 |
| D435,733 S | | 1/2001 | Osterholt | |
| 6,530,548 B2 | * | 3/2003 | Pizzirusso | A47G 29/083 |
| | | | | 248/304 |
| 7,182,304 B2 | * | 2/2007 | Adams | A47G 29/083 |
| | | | | 248/205.5 |
| 7,322,554 B2 | | 1/2008 | Caroselli et al. | |
| 7,389,966 B1 | | 6/2008 | Hunter | |
| 7,464,911 B1 | | 12/2008 | Yen | |
| 7,847,692 B2 | * | 12/2010 | Schuller | G08B 25/10 |
| | | | | 248/346.03 |
| 9,115,845 B2 | * | 8/2015 | Madigan | F16M 13/02 |
| 2004/0195484 A1 | * | 10/2004 | Sheeran | A47G 29/083 |
| | | | | 248/304 |
| 2006/0108496 A1 | | 5/2006 | Miranda | |
| 2006/0108497 A1 | * | 5/2006 | Miranda | A47G 29/083 |
| | | | | 248/690 |
| 2008/0087618 A1 | | 4/2008 | Laney | |
| 2009/0109027 A1 | | 4/2009 | Schuller | |
| 2016/0029852 A1 | | 2/2016 | Ljung | |
| 2018/0084935 A1 | * | 3/2018 | Schwab | A47G 29/087 |

OTHER PUBLICATIONS

German Office Action for Application No. 11 2017 000 844.1, dated Dec. 10, 2018, 9 pages.

\* cited by examiner

SUPPORT DEVICE FOR AN ARTICLE

FIELD OF THE INVENTION

The present invention relates generally to a support for an article. More specifically, the present invention relates to a support device that removably engages a base horizontal surface.

BACKGROUND OF THE INVENTION

Cleaning handheld utensils become more popular and varied over time in performing functions in the house, specifically in the toilet room and the kitchen. These utensils are commonly left throughout the kitchen countertop area. In many cases, the cleaning utensils are disposed in or above a container filled with soap or dishwashing liquid. Further, awareness to cleaning level of the cleanings utensils rises, especially when mounted on central spaces such as the kitchen countertop. Many times, hence, the cleaning utensils are placed in the sink.

The cleaning utensils are usually placed upon the countertop, consuming expensive real estate in the kitchen and leaving a sticky mess to be cleaned. Holders for those cleaning utensils are often connected using a mechanism to a wall or to the sink. The mechanisms make the holders hard to be moved from one room to another, or from one space in the kitchen to another.

What is needed is a low cost, compact, and easy to install article support device that supports an article in the form of a cleaning utensil.

SUMMARY OF THE INVENTION

The present invention discloses a support device of an article, comprising a weight member configured to be mounted on a horizontal surface, a rod extending laterally from the weight member and then extending downwards, a curve on which the article is mounted, wherein the curve extends from the rod, wherein the curve is located under the horizontal surface and laterally from the weight member and a holder extending upwards from the curve, such that the article is held between the rod and the holder.

The support device does not require a physical connection or fixation to a surface, such as screws or vacuum pads, as the weight member provides the required stability. The support device is not limited to a specific surface, as opposed to other holders, for example vacuum pads which only apply to a specific surface type. The support device of the present invention is easily removed from one point to another, as the weight member is not affixed and there is no damage to the surface when the support device is removed therefrom.

In some cases, the weight member weighs more than the accumulated weight of the rod, the curve, the holder and the article.

In some cases, the support device may be made of a single sheet of material, for example a stainless still mold. In some cases, at least a portion of the weight member is covered by a synthetic material. In some cases, at least a portion of the rod is covered by a synthetic material. In some cases, a bottom surface of the weight member is flat.

In some cases, the support device further comprises multiple holders extending from the rod. In some cases, the multiple holders extend from the rod at different heights. In some cases, the multiple holders extend from the rod at the same height; wherein at least two of the multiple holders extend laterally from the rod.

In some cases, the curve is wider than the rod. In some cases, the rod comprises wires surrounding the weight member at multiple heights. In some cases, the rod is removable from the weight member.

In some cases, the weight member is a cup filled with liquid, or an empty cup. The cup may have a thick base, or thick sidewalls, to form the weight member. In some cases, the cup's base may be made of metal while the sidewalls are made of glass or plastic. In some cases, the rod is connected to an extension surrounding the cup. In some cases, the rod is attached to weight member via adhesive. In some cases, the rod is attached to top surface of weight member. In some cases, the rod is attached to bottom surface of weight member. In some cases, the support device further comprises a cover extending from the holder, said cover is configured to cover the article from above.

In some cases, the weight member has a bottom portion comprises multiple distinct legs. In some cases, the weight member is assembled of multiple rigid weight connected together by one or more connectors. In some cases, the one or more connectors are made of an elastic material.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

The present invention discloses a support for an article. The article may be a cleaning utensil such as a cleaning pad, toilet paper rolls, toothbrush, paper trash, stationery, Light kitchen accessories, hand towels, cosmetics, and the like. The holder is configured to be placed on a horizontal surface located above the floor, such as a shelf, table, kitchen countertop, upper surfaces of sinks and others. The support comprises a weight member located on the horizontal surface and a rod extending laterally from the weight member. The rod is extended downwards and ends with a holder for holding the article. The weight member may have a flat base being in contact with the flat surface of the shelf or the kitchen worktop. The holder is located downwards and sideward from the weight member. That is, the holder is not located right below the weight member, but both beneath and sideward. For example, the weight member is mounted on the kitchen worktop and the holder is located inside the sink.

Figures 1, 2A, 2B:
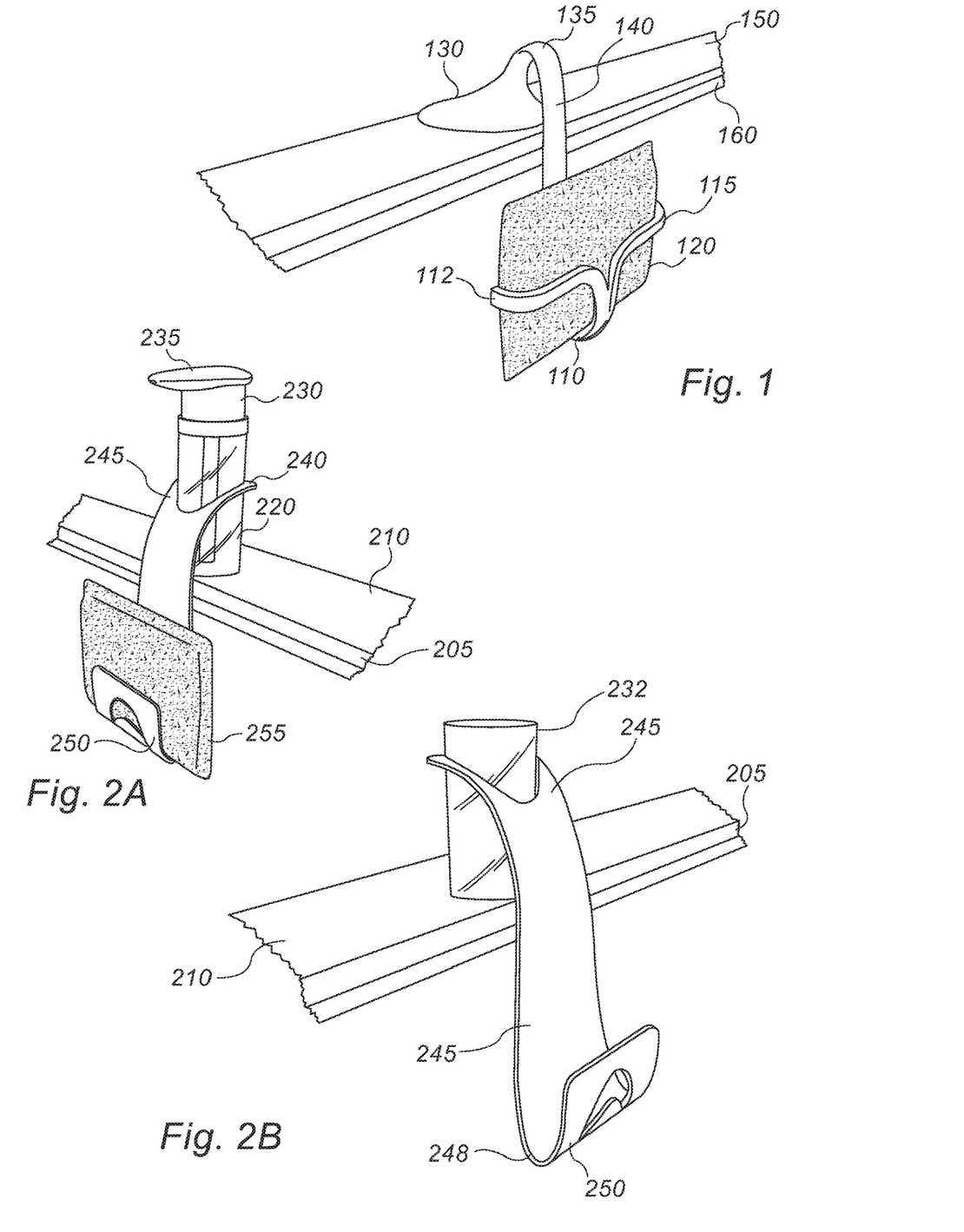
FIG. 1 shows a support and an article carried by a holder, according to exemplary embodiments of the subject matter.
FIG. 2A shows a support comprising a liquid container and an article carried by a holder, according to exemplary embodiments of the subject matter.
FIG. 2B shows a support comprising a cup and an article carried by a holder, according to exemplary embodiments of the subject matter.
Figure 6:
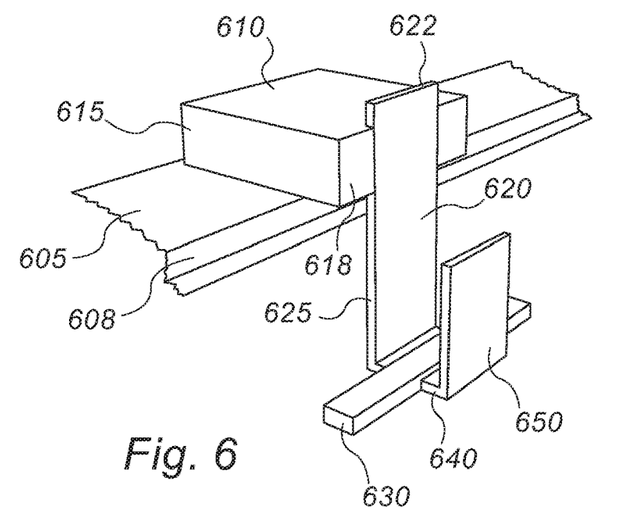
FIG. 6 shows a support and an article carried by a holder, according to exemplary embodiments of the subject matter.

FIG. 1 shows a support and an article carried by a holder, according to exemplary embodiments of the subject matter. The support comprises a weight member 130 mounted on a horizontal surface 150. The horizontal surface 150 may be a top surface of a shelf or a table, having also a lateral surface 160. The lateral surface may be high, such as a kitchen countertop or short as a shelf. The holder is located below the horizontal surface 150. The weight member 130 may be made of a plastic material, wood, metal or any other material or a combination of materials desired by a person skilled in the art. The weight member 130 may be shaped as a cube or a box as shown in FIG. 6. In some other cases, the weight member 130 may be shaped elliptically. The weight member may be embedded in an object, such as forming a base of a container.

The weight member 130 is connected to a first rod 135. The rod first 135 may be connected mechanically to the weight member 130 or be molded with the weight member 130 as a single unit. The first rod 135 extends upwards, away from the horizontal surface 150. The first rod 135 is connected to a second rod 140 extending downwards, below the horizontal surface 150. In some other cases, the first rod 135 extends laterally without extending upwards, such that the weight member 130 is the upmost element in the support.

The second rod 140 extends downwards until a curve 110 that defines the lowest point of the support. The article 120 rests on the curve 110 and held between the second rod and lateral holders 112, 115 extending from the curve 110. The lateral holders 112, 115 split from the curve 110 and extend upwards (toward the horizontal surface 150) and then laterally, to opposite directions.

The first rod 135, the second rod 140 and the lateral holders 112, 115 may be made of plastic material. The rods and lateral holders may be covered by a thin layer of a plastic material such as polyethylene, polypropylene and others.

The weight of the weight member 130 may be at least the accumulated weight the rest of the support, namely the first rod 135, the second rod 140 and the lateral holders 112, 115, as well as the article 120. In some cases, the weight member 130 may be less than the accumulated weight the rest of the support, depending on the friction between the weight member 130 and the horizontal surface 150. The bottom surface of the weight member may be covered with a slip resistance material.

FIG. 2A shows a support comprising a liquid container and an article carried by a holder, according to exemplary embodiments of the subject matter. The liquid container 220 may comprise water, liquid soap, dishwashing liquid and the like. The liquid container 220 functions as weight member 130 and the weight of the liquid container 220 should also carry the rest of the support as well as article 255 held between holder 250 and rod 245, on curve 248 shown in FIG. 2B. The holder 250 and rod 245 may be substantially perpendicular to the horizontal surface 210 on which the liquid container 220 rests. Lateral surface 205 may be parallel to the holder 250 and rod 245. Lateral surface 205 may be an inner wall of a sink, or a lateral surface of a shelf, extending away from the wall to which the shelf is attached. The rod 245 may be attached to a ring-like extension 240 surrounding the liquid container 220 for carrying the rod 245. The ring-like extension 240 may be removable from the liquid container 220, for example when wishing to clean the rod 245 and holder 250. The ring-like extension 240 may surround only a portion of the liquid container 220.

The liquid container 220 is activated by a person pressing on handle 235 connected to pump 230 which extracts the liquid from the liquid container 220 via an aperture. The liquid container 220 may function as the weight member also when empty or partially empty.

FIG. 2B shows a support comprising a cup and an article carried by a holder, according to exemplary embodiments of the subject matter. The cup 232 may be empty and used by a person for carrying items such as dish cleaning brushes, decorative element such as a flowerpot and the like.

Figures 3A, 3B, 4A, 4B, 5A, 5B, 5C:
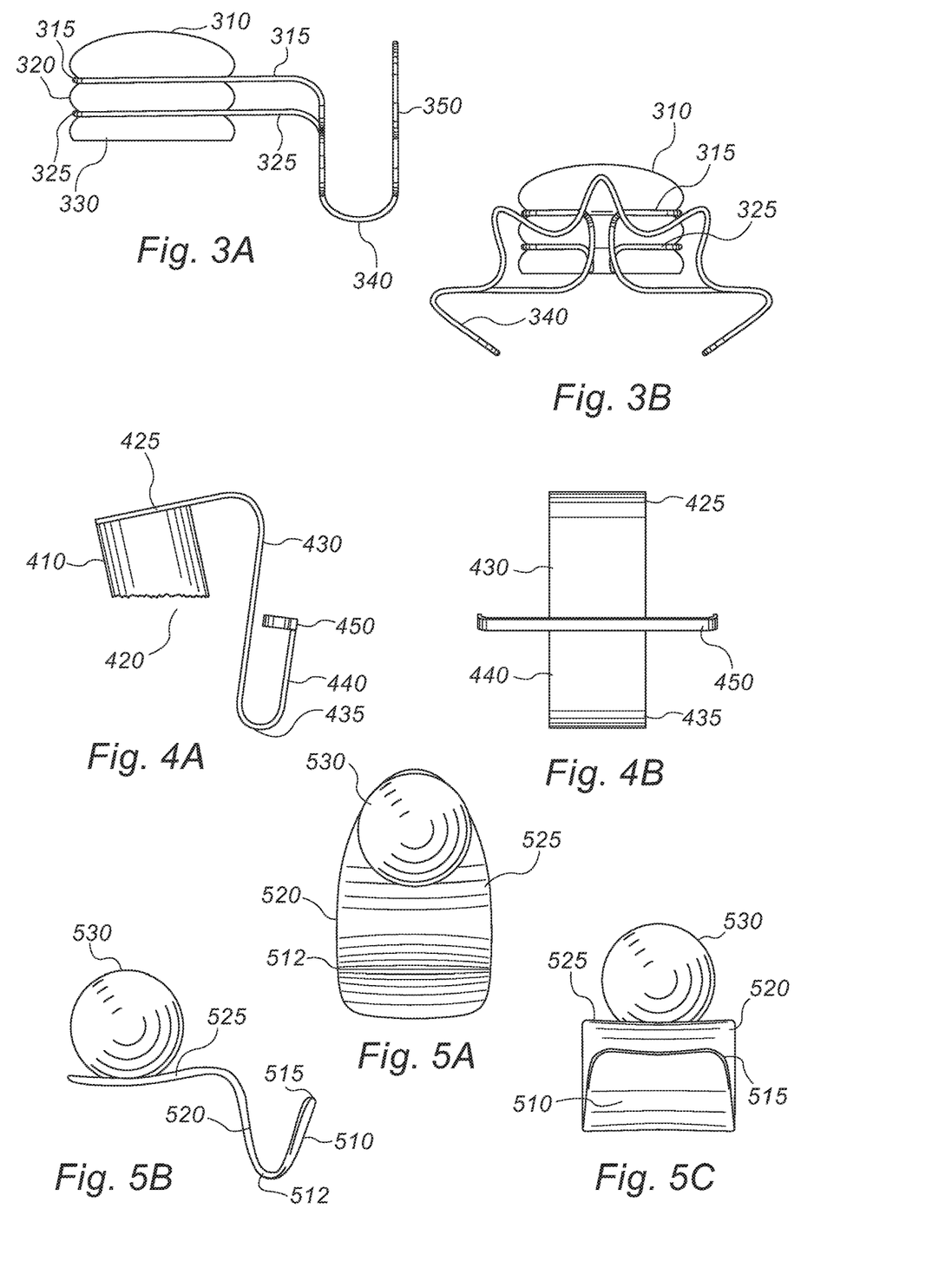
FIG. 3A shows a lateral view of a support comprising a weight member and a rod surrounding the weight member, according to exemplary embodiments of the subject matter.
FIG. 3B shows a back view of a support comprising a weight member and a rod surrounding the weight member, according to exemplary embodiments of the subject matter.
FIG. 4A shows a side view of a support comprising a weight member and a rod attached thereto, according to exemplary embodiments of the subject matter.
FIG. 4B shows a front view of a support comprising a weight member and a rod attached thereto, according to exemplary embodiments of the subject matter.
FIGS. 5A-5C show a support comprising a weight member and a rod connected to a bottom surface of the weight member, according to exemplary embodiments of the subject matter.

FIG. 3A shows a lateral view of a support comprising a weight member and a rod surrounding the weight member, according to exemplary embodiments of the subject matter. The weight member comprises a single unit having one more niche along its peripheral surface, where the rod surrounds the weight member. The weight member comprises a bottom portion 330, middle portion 320 and top portion 310. Two niches are formed—first niche in the peripheral section between bottom portion 330 and middle portion 320 and second niche in the peripheral section between middle portion 320 and top portion 310. The rod surrounding the niches may be a metal wire. For example, first wire 325 surrounds the first niche and second wire 315 surrounds the second niche. After surrounding the niches, the first wire 325 and the second wire 315 extend laterally, for example in the length of 2-20 centimeters. Then, the wires extend downwards until curve 340, and then upwards as holder 350. The curve 340 is located lower than bottom portion 330. FIG. 3B shows a front view of a support comprising a weight member and a rod surrounding the weight member, according to exemplary embodiments of the subject matter.

FIG. 4A shows a side view of a support comprising a weight member and a rod attached thereto, according to exemplary embodiments of the subject matter. The weight element 410 rests on a surface 420 as the base of the weight element 410 may be flat. The base of the weight element 410 may be covered in a layer of material characterized with a high friction, to increase the stability of the support. A rod 425 is attached to the top surface of the weight element 410, for example using an adhesive material, screws and the like. The rod 425 extends laterally, further then the tip of the weight element 410 and then extends via second rod 430 downwards until curve 435. The curve 435 is located under the surface 420. Holder 440 extends from the curve 435. Lateral pole 450 is attached to the holder 440. Lateral pole 450 may extend laterally further than the width of the weight member 410.

FIG. 4B shows a front view of a support comprising a weight member and a rod attached thereto, according to exemplary embodiments of the subject matter. In the front view, the holder 440 is located under the lateral pole 450 while the second rod 430 is shown above the lateral pole 450.

FIGS. 5A-5C show a support comprising a weight member and a rod connected to a bottom surface of the weight member, according to exemplary embodiments of the subject matter. FIG. 5A shows a top view, FIG. 5B shows a side view and FIG. 5C shows a front view. Weight member 530 is connected to a first rod 525. The first rod 525 may be attached to the weight member 530 using adhesive material, using a screw, a nut and the like. The first rod 525 is attached to bottom portion of the weight member 530. The first rod 525 extends laterally and connects to a second rod 525 extending downwards, until curve 512, on which an article (not shown) rests. Curve 512 is connected to holder 510 extending to the tip 515 of the support. In some cases, the first rod 525, second rod 525, curve 512 and holder 510 are made of a single sheet of material, for example aluminum, plastics, glass, stainless steel, wood, and the like. The rods may be made of a rigid material.

FIG. 6 shows a support and an article carried by a holder, according to exemplary embodiments of the subject matter. Weight member 615 is mounted on horizontal surface 605. The lateral surface 618 of the weight member 615 extends further than the lateral surface 608 of the surface 605 on which the weight member 615 rests. Plate 620, 625 is attached to the distal end of the weight member 615 and extends downwards until reaching base 640. In some cases, the top end 622 of the plate 620, 625 is higher than the top end 610 of the weight member 615. Shelf 630 is attached to base 640 and extends laterally from the base 640, to enable more space and stability for the article held between the holder 650 and the plate 620.

Figure 7:
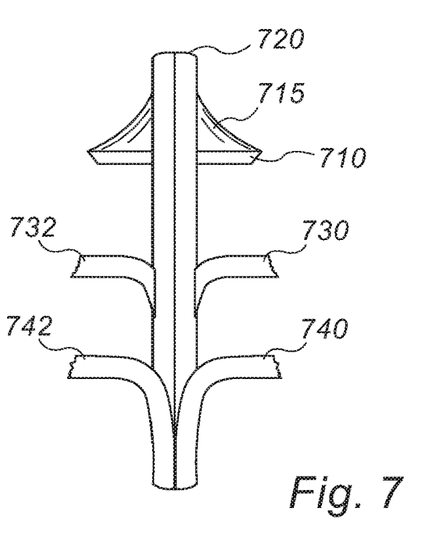
FIG. 7 shows a support comprising multiple holders, according to exemplary embodiments of the subject matter.

FIG. 7 shows a support comprising multiple holders, according to exemplary embodiments of the subject matter. The weight member has a flat bottom surface 710 mounted on a horizontal surface. The body 715 of the weight member may be coated or otherwise covered by a plastic material such as silicone, polyethylene, polypropylene and others. A rod 720 extends downwards from the body 715 of the weight member. Pairs of holders extend laterally from the rod 720. Each holder is configured to hold a separate article. In some cases, the holders may extend upwards after they extend laterally, for example for carrying toilet paper rolls. The first pair comprises holders 730 and 732 and the second pair comprises holders 740 and 742. The pairs may be of the same height, or from the same distance from the body 715. In some other cases, more than two holders from each height of the rod 720.

Figure 8:
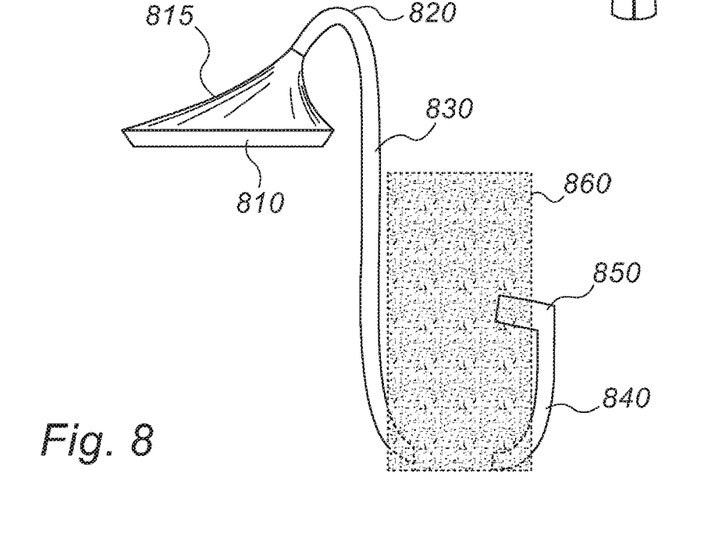
FIG. 8 shows a holder comprising a weight member covered by nylon and a holder, according to exemplary embodiments of the subject matter.

FIG. 8 shows a holder comprising a weight member covered by nylon and a holder for holding a container, according to exemplary embodiments of the subject matter. The weight member has a flat bottom surface 810 and a body 815 covered by nylon. Rod 820 extends from the body 815. The rod 820 extends laterally and then downwards to second rod 830. At least a portion of the rod 820 may be covered by the same sheet of nylon covering the body 815 of the weight member. The second rod 830 extends to holder 840 that extends upwards until it meets a portion 850, and afterwards it extends rearwards towards the weight member. A container 860 is in contact with the second rod 830 and the holder 840. The container 860 may be removable or replaceable, and may be of various sizes, colors, and for multiple uses.

Figures 9, 10:
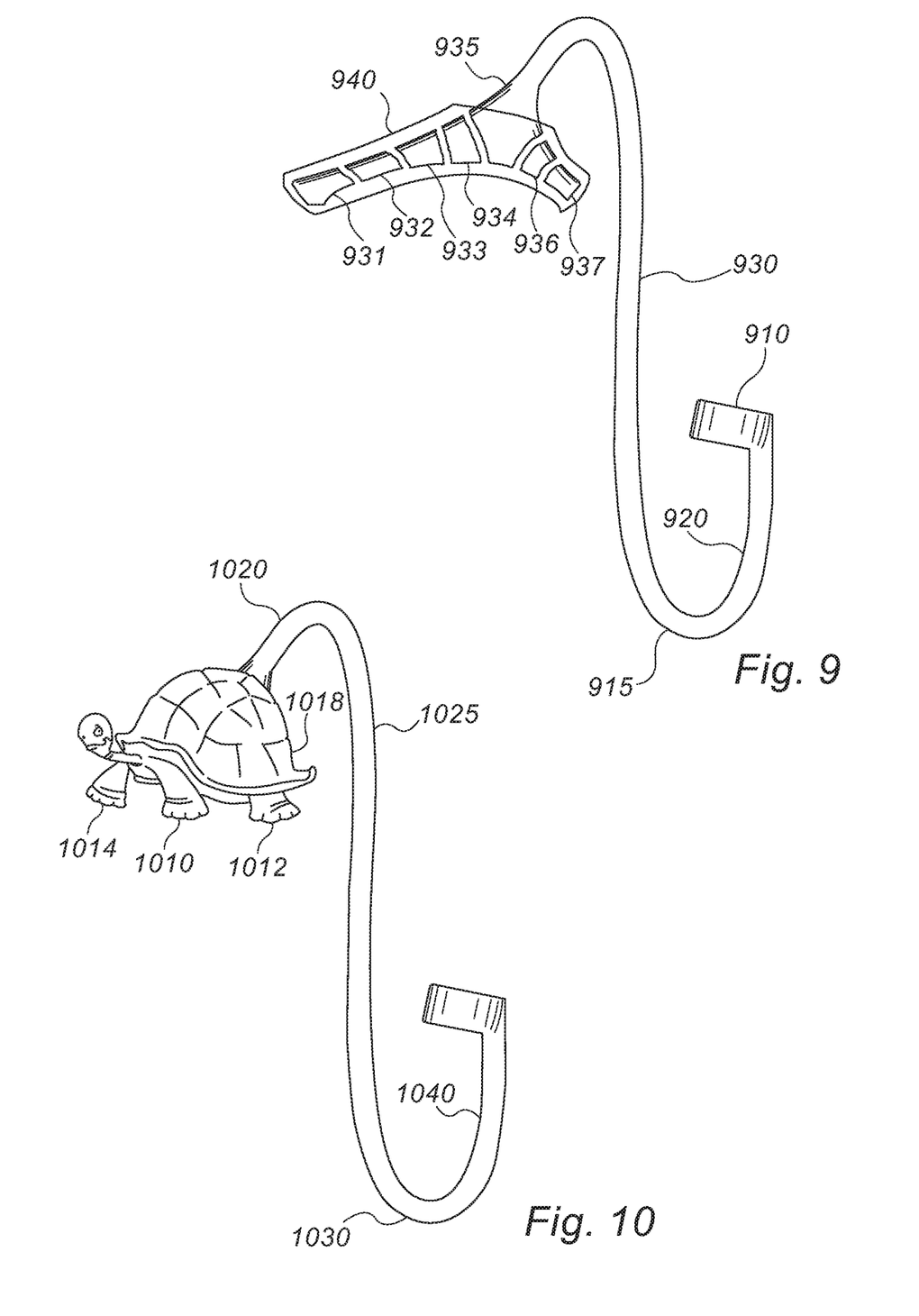
FIG. 9 shows a holder comprising a weight member assembled of multiple connected sections, according to exemplary embodiments of the subject matter.
FIG. 10 shows a holder comprising a weight member comprising multiple bottom surfaces, according to exemplary embodiments of the subject matter.

FIG. 9 shows a holder comprising a weight member assembled of multiple connected sections, according to exemplary embodiments of the subject matter. The multiple sections 931, 932, 933, 934, 935, 936 and 937 are connected to each other via elastic or semi-elastic connectors, for example by wires. This structure enables placing the holder on other surfaces, as the plurality of sections increase the stability of the entire holder. Each of the multiple sections 931, 932, 933, 934, 935, 936 and 937 is connected to at least one other section. The multiple sections may be connected in series, or connected in a star-like manner, in which one section is connected to all the other sections. One of the section, for example section 935 is connected to rod 930 that extends downwards from the weight member 940. The rod 930 is connected to curve 915, which extends to holder 920. The holder 920 extends to cover 910 as disclosed above.

FIG. 10 shows a holder comprising a weight member comprising multiple bottom surfaces, according to exemplary embodiments of the subject matter. The weight member 1018 is connected to multiple elements 1010, 1012, 1014 interfacing the weight member 1018 to the surface on which the weight member 1018 is mounted. The multiple elements 1010, 1012, 1014 may be of a flat bottom surface. The multiple elements 1010, 1012, 1014 and the weight member 1018 may be made of a single mold. The weight member 1018 is connected to a first rod 1020 extending upwards and laterally. The first rod 1020 is connected to a second rod 1025 extending downwards, until curve 1030. The curve 1030 extends to holder 1040.

Figure 11:
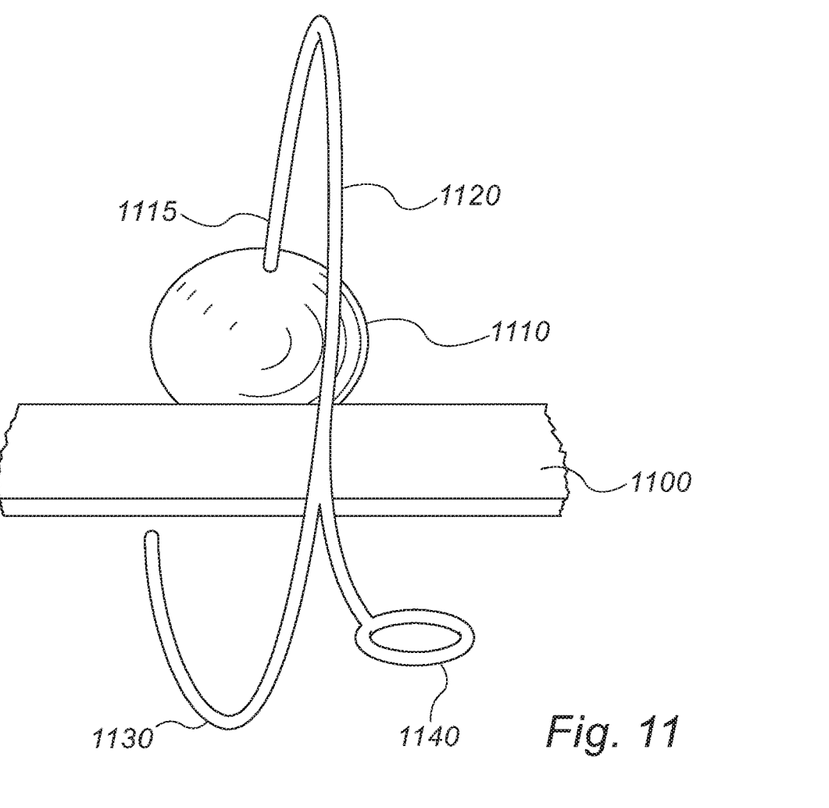
FIG. 11 shows a holder comprising a weight member connected to multiple holders, according to exemplary embodiments of the subject matter; and, FIG. 12 shows a holder comprising a weight member connected to a flat holder, according to exemplary embodiments of the subject matter.

FIG. 11 shows a holder comprising a weight member connected to multiple holders, according to exemplary embodiments of the subject matter. The weight member 1110 is connected to a first rod 1115 extending upwards and laterally. The first rod 1115 is connected to a second rod 1120, extending below a lateral surface 1100 connected to the surface on which the weight member 1110 is mounted. The second rod 1120 is split to two holders 1130 and 1140. The holders 1130 and 1140 may be of different size and shape, as desired by a person skilled in the art.

Figure 12:
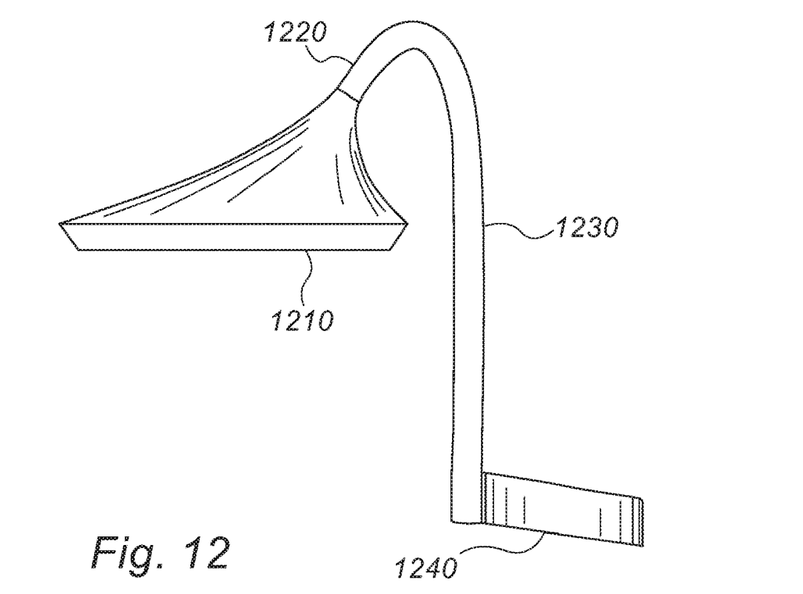

FIG. 12 shows a holder comprising a weight member connected to a flat holder, according to exemplary embodiments of the subject matter. The weight member 1210 is connected to a first rod 1220 extending upwards and laterally. The first rod 1220 is connected to a second rod 1230. The second rod is connected to a flat holder 1240. The flat holder 1240 is defined as having no sidewalls other than the second rod 1230. The flat holder 1240 may be of an elliptical shape, similar to holder 1140 of FIG. 11. In some cases, the holder's 1240 width may be at least three times the width of the weight member 1210. In some cases, the holder's 1240 width may be in the range of 5-8 centimeters.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A support device configured to be placed on a horizontal surface and to hold an article, the support device comprising:
   a weight member configured to be placed on the horizontal surface;
   a rod extending from the weight member, wherein the rod comprises a first rod portion extending frontwards from the weight member and a second rod portion extending downwards from the first rod portion, said first rod portion and said second rod portion form a first curve with a downward concavity, wherein the second rod portion is configured to extend downwards beyond an edge of the horizontal surface;
   a second curve extending frontwards from a distal end of the second rod portion with an upward concavity, wherein the second curve is configured to be located lower than the horizontal surface and offset from the weight member along a frontward-rearward axis;
   a support element extending upwards from the second curve and configured to hold the article at a distance from the horizontal surface along the frontward-rearward axis, wherein the second rod portion is configured to secure a first side of the article above the second curve and the support element is configured to secure a second side of the article above the second curve;
   wherein the support element comprises a first lateral holder and a second lateral holder, each of the first and second lateral holders includes a first portion extending upwards from the second curve, a second portion extending from the first portion, and a third portion extending rearwards from the second portion, the first portion of each of the first and second lateral holders has a first end and a second end, the first portions of the first and second lateral holders extend divergently from the second curve with the first ends split from the second curve and the second ends spaced apart from each other, and the second portions of the first and second lateral holders extend in opposite lateral directions away from each other; and
   wherein the weight member is configured to weigh more than an accumulated weight of the rod, the support element, and the article.

2. The support device according to claim 1, wherein at least a portion of the weight member is covered by a synthetic material.

3. The support device according to claim 1, wherein the rod is connected to the weight member.

4. The support device according to claim 1, wherein the rod is molded with the weight member as a single unit.

5. The support device according to claim 1, wherein the weight member is made of plastic, wood, or metal.

6. The support device according to claim 1, wherein the rod extends upwards and frontwards from the weight member.

* * * * *